Aug. 31, 1965   R. E. LAISY   3,203,303

BLIND FASTENER

Filed Aug. 10, 1964

INVENTOR.
RUDYARD E. LAISY
BY Williams, David
Hoffmann & Yount
ATTORNEYS 3,203,303
BLIND FASTENER
Rudyard E. Laisy, Rocky River, Ohio, assignor to The National Screw & Manufacturing Company, Cleveland, Ohio, a corporation of Ohio
Filed Aug. 10, 1964, Ser. No. 388,631
10 Claims. (Cl. 85—77)

This application is a continuation-in-part of my copending application, Serial No. 108,866 filed May 9, 1961, and now abandoned, entitled Blind Fastener, the specification, drawings, etc. of which are incorporated herein by reference. The present invention relates to fasteners and, more particularly, to so-called "blind" bolts or rivets.

The principal object of the invention is the provision of a novel and improved screw-type blind fastener especially designed for use in the aircraft, automotive and other industries which will be relatively inexpensive to produce, have a minimum number of parts and will tightly clamp and fixedly hold the parts secured together thereby.

The invention resides in certain constructions and arrangements of parts which will be hereinafter referred to in connection with the following description of the preferred embodiment described with reference to the accompanying drawings forming a part of this specification in which similar reference characters designate corresponding parts, and in which.

Figure 1:
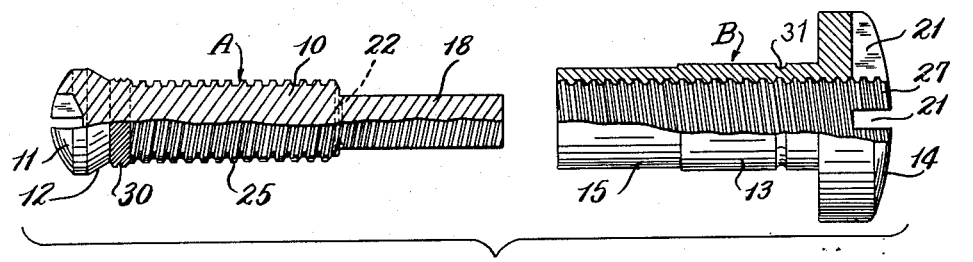
FIG. 1 is an expanded view of a fastener embodying the present invention, with parts broken away and in axial section to better show the construction.

Referring to the drawings, the blind fastener shown has only two parts: a screw or mandrel A comprising a shank 10 having a head 11 at one end provided with an outwardly and rearwardly tapered or conical bearing face 12, and a combined nut and blind head member B, hereinafter referred to as the nut, comprising a cylindrical shank or body portion 13 having an external or nonblind head 14 at one end and a cylindrical end portion 15 at the other end like the body portion 13 but of slightly reduced outside diameter. The end portion 15 of the member B forms the blind head part of the fastener. The members A and B are also referred to as the blind or internal and nonblind or external members, respectively. The member B is threaded and is assembled on the shank 10 of the screw A with the heads 11, 14 at opposite ends of the fastener.

In use the assembled fastener is inserted with the screw head 11 leading into aligned holes in members to be secured together thereby, such as, the holes 16, 17 in the plate-like members C, D. The fastener is inserted from the accessible side of the member or plate C and is such that the blind end of the portion 15 of the nut B projects beyond the inaccessible side of the member or plate D. The cylindrical body portion 13, of the nut, however, does not project through or beyond the nonaccessible side of the member D. It preferably stops short of the inaccessible side of the member D a small amount or distance; in some instances, however, it may extend a small distance beyond the inaccessible side of the member. After the fastener is assembled with the members to be secured together thereby in the manner described, the fastener is driven or set by producing relative rotation between the screw A and the nut B to draw the head 11 of the screw A into the blind end 15 of the nut B. This expands at least the adjacent part of the portion 15 of the blind end of the nut B which is within the plate or plates into tight engagement therewith and expands or flares, without splitting, the part of the portion 15 of the blind end of the nut B which extends beyond the nonaccessible side of the member D over the tapered or conical bearing face 12 of the head 11 adjacent thereto drawing the members C, D tight together.

The fastener is preferably set by rotating the screw A while the nut B is held stationary. When the fastener is set in this manner the blind head portion or end of the nut B is expanded by relative rotation therebetween and the head 11 of the screw A. The operation is analogous to that of metal "spinning." When the fastener is driven to a predetermined tension, the plate-like members C, D are securely drawn and fixed together or clamped between the accessible head 14 of the nut B which engages the exposed side of the plate-like member C, adjacent thereto, and the blind head of the fastener formed by the expanded end or portion 15 of the nut and which blind head engages the nonaccessible side of the plate-like member D adjacent thereto.

The maximum diameter of the head 11 of the screw A which is preferably about 1.4 to 1.8 times the mean diameter of the basic or unmodified thread of the screw A and the maximum diameter of the shank or body portion 13 of the nut B are substantially equal, and the hole or holes in the work are such that the fastener can be readily inserted therein by hand but will not be loose therein. The screw A and, if desired, the nut B are provided with driving connections or means accessible at the exposed side of the plate C, which connections are adapted to be engaged by complementary connections on a driving tool. That portion of the shank 10 of the screw A which normally projects beyond the nut B when the bolt is driven, and which portion is designated as 18, is provided with means to be engaged by a driving tool. As shown, the two opposite sides of the portion 18 are flattened and are adapted to be engaged or received in a suitable, complementary aperture in the driving tool, and the head 14 of the nut B shown is provided with slots or recesses 21 adapted to be engaged by projections on the tool to hold the nut B stationary while the screw A is rotated.

The shank 10 of the screw A is preferably weakened at the inner ends of the driving portion 18 as by the provision of a groove 22 which leaves a notched section of predetermined area and which will break when subjected to predetermined torque. When the fastener is used, the screw A is rotated until the driving end portion 18 breaks away from the shank 10 at the notched section. This assures driving the fastener to a predetermined torque and the tightening of the fastener to a predetermined stress or load. The head 14 of the nut B, as shown, is of the brazier or pan type, but other types of heads may be employed, for example, countersunk, round, hex, etc.

The shanks of the screws of the bolts are preferably made to standard screw sizes, for example, American Standards Association, Unified thread, National Fine 2A, 4–48, 6–40, 8–36, 10–32, 12–28, and other threads as defined by H28 (1944) Handbook, National Bureau of Standards, issued February 17, 1945, sections II, III and IV, modified as explained herein, if desired, and a given shank size predetermines, to some extent, the construction of the other parts, etc. In the embodiment shown, the thread 25 of the screw A extends along the shank 10 of the screw A to a point adjacent to the head 11. The effective diameter of a short portion or section 26 of the shank 10 of the screw adjacent to the head 11 may be increased 1% to 3% with reference to that of the remainder of the shank because this portion of the shank is subjected to a complex combination of shear, torsion and tensile stresses and loads, and is the part of the shank most likely to fail.

The threads of the screw are preferably formed on the shank 10 by thread rolling and the diameter $a$ for the length $b$ of the shank 10 which constitutes the section 26 may be increased over that of the rest of the threads of the shank by grinding off the crests of the threads of the shank along the head edge to produce a thread root diameter $a$ slightly larger than the thread root diameter $c$ of the remainder of the thread of the shank 10. In the embodiment shown, the effective diameter of the shank 10 to the right of the section 26 is increased with respect to that of a standard screw of the same size or thread diameter $d$ by grinding off the crests of the other threads of the dies to form a thread having the root diameter $c$ greater than the standard root diameter $c$ for the same thread diameter $d$ but not sufficiently great to cause interference therebetween and the internal mating thread 27 in the nut B which is preferably formed with a standard tap. This feature may or may not be employed as desired. While in the embodiment shown, the roots of the threads of the screw are flat, rounded roots may be employed, if desired.

Figures 2, 3:
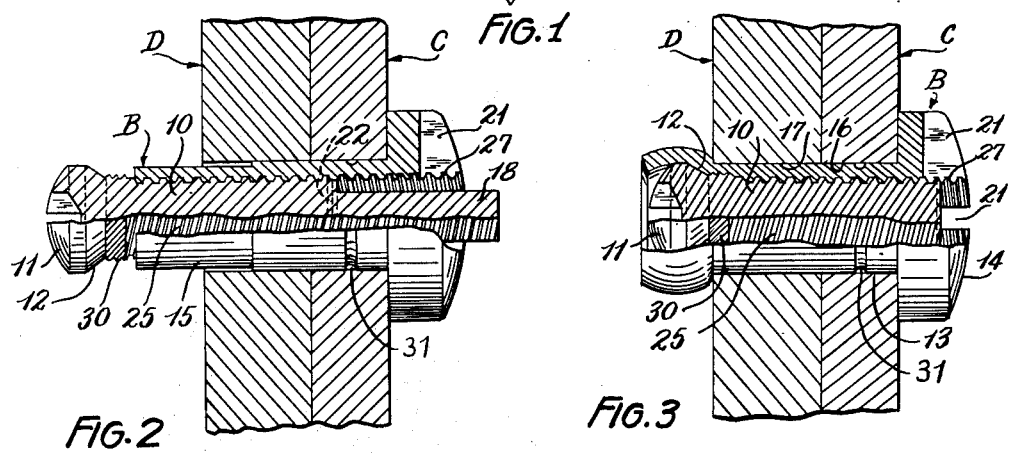
FIG. 2 is an axial, sectional view, with portions in elevation, showing the fastener in position to be driven in two members to be secured together thereby.
FIG. 3 is a view similar to FIG. 2 but showing the fastener after being driven and fixedly securing the members together.
Figure 4:
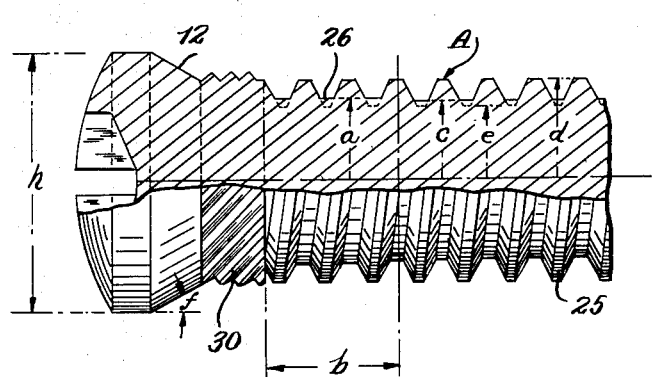
FIG. 4 is an enlarged, fragmentary, axial, sectional view of the head end of the blind member or screw.

In practice, the fasteners are made in different lengths, each designed to fasten two or more members together having an overall thickness within fairly wide limits. The lengths of the respective parts while being made as short as possible consistent with other requirements in an effort to save weight, etc., are preferably so proportioned that when the bolt is in use or driven, the blind end of the nut B projects over the head 11 of the screw A. The material of the portion 15 of the nut B is preferably such, as are the dimensions of the various parts, that as the blind end of the nut is expanded over the head 11 of the screw A severe stresses are set up therein which exceed the yield strength of the material but are not great enough to cause the material to take a permanent set at its maximum expansion and as the head of the screw moves inwardly beyond the blind end of the nut, relaxation of these stresses in the end which extends beyond the head 11 of the screw A causes or permits the end of the nut to contract slightly over the blind side of the head 11 thereby effectively locking the nut and screw together against unthreading. This feature is shown in FIG. 3 of the drawings for purposes of illustration, however, the extent to which the blind end of the nut contracts is exaggerated in the drawings.

The shank 10 of the screw A shown is provided with a plurality of serrations 30, immediately adjacent to the head 11 of the screw. The serrations 30, shown, are rolled in the shank of the screw and are inclined at an angle of about 45° in the direction of the inclination of the threads of the screw. In other words, the thread of the screw for a short distance immediately adjacent to its head, is distorted in the same general direction as the thread lead. These serrations when employed further lock the screw and nut together against unthreading after the fastener is driven. This feature may or may not be employed as desired and when not employed the thread of the screw is preferrably extended to the head of the screw. Locks other than the locks mentioned above may be used for preventing unthreading of the screw A in the nut B. A thread interference lock may be provided, for example, by rolling a continuous groove 31 in the body portion of the nut, preferably adjacent to the head but spaced slightly therefrom or by forming circumferentially spaced depressions or indentations at approximately the same location with respect to the head by a suitable tool to thereby decrease the internal diameter of the nut thread underneath the groove or other depressions and thus cause limited portions of the nut to more tightly grip the screw, preferably equivalent to the class 5 or interference fit defined by the aforesaid H28 Handbook, pages 23 to 25, than would otherwise be the case. The remaining portions of the threads preferably interengage one another with a noninterference or clearance fit, that is, a fit other than a class 5 or interference fit as defined by said Handbook H28.

It has been discovered that if the so-called blind head portion 15 of the nut of the fastener is made slightly less in diameter, approximately .5% to 9% than the diameter of the body portion of the nut and in turn slightly smaller than the hole or holes in the members to be secured together a much improved drawing together of the members, that is, clamp-up or draw-up action is obtained. In other words, the parts or plates are clamped up tighter, that is, drawn together upon the driving of the fasteners than would otherwise be the case. The optimum reduction in the diameter of the blind head portion 15 with respect to the diameter of the main shank or body portion of the nut has been discovered to be approximately 4%, that is, the diameter of the blind head portion should be equal to approximately 96% of the diameter of the body portion, which, as previously stated, should be such that the fastener can be inserted by hand into the apertures in the parts to be secured together but will not be loose therein. The reduction in diameter is exaggerated in the drawings.

Figure 5:
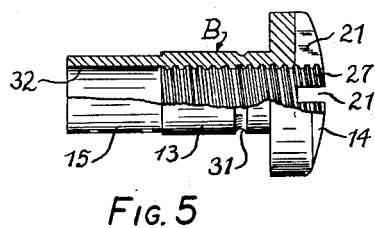
FIG. 5 is a view similar to the right hand part of FIG. 1 but showing a nut of modified construction.

The internal threads in the nut B are preferably made to the same standards as those of the screw, that is, A.S.A. Unified thread. In this event the wall thickness of the cylindrical body portion of the nut measured to the crest of the thread is about 18% to 22% of the outside diameter of the body portion. The internal threads of the blind-head part of the nut may be removed, if desired, as by counterboring. In fact the blind head part 15 of the nut may be counterbored as indicated at 32 in FIG. 5 so long as the remaining wall thickness thereof is within about 8% to 17% of the outside diameter of the tubular portion of the nut.

As previously stated, in practice the fasteners are made in different lengths, each designed to fasten two or more members together having an overall thickness within fairly wide limits. These limits are commonly referred to as the maximum and minimum grip lengths of the fasteners and the length of the main body portion of the nut, that is, the portion of full diameter is preferably approximately equal to the mean grip length less one-fourth of the difference between the maximum and minimum grip lengths. As an example, if the diameter of the body portion of the nut is .250″ the diameter of the blind head end is preferably from about .008″ to 0.12″ less and if the grip range is .125″ the length of the full diameter body portion of the nut is preferably about .062″ less than the mean grip range.

The screw A may be made of a heat treatable alloy or carbon steel and the nut B of a commercial low carbon steel heat treated to obtain the desired characteristics, for example, ductility, but the nut may be made of any suitable material, such as, aluminum or a corrosion-resistant steel sensitive to cold-working, that is, a steel capable of having its hardness and strength improved by cold-working, for example, AN–QQ–771. As an alternative construction, the nut B may be made of hard and nonductile material like the screw A and the blind end annealed or otherwise treated to produce the desired characteristics. If desired, the entire fastener may be made of so-called "high temperature" material, that is, material which will withstand temperature up to 2000° F. and more without failure.

The angle F of taper of the tapered or conical portion 12 of the head 17 is reasonably critical as the longitudinal and radial forces produced thereby against the end of the nut B must be proportioned within the limits of the material used. The angle of the bevel should be not less than about 20° or greater than about 30° with reference to the longitudinal axis of the screw. An angle of 25° is preferred. The diameter *h* of the head of the screw A is preferably about one and five-eighths to about one and three quarters times the mean thread.

While in the preferred embodiment of the invention shown, the bearing face 12 is conical, under some circumstances it may be desirable to have the same arcuate in cross-sectional shape or elliptical with the inclination gradually increasing with respect to the longitudinal axis of the fastener.

From the foregoing description of the preferred embodiments of the invention, it will be apparent that the objects heretofore enumerated and others have been accomplished and that there has been provided a novel and improved so-called blind fastener or bolt. While the preferred embodiment of the invention has been described in considerable detail, the invention is not limited to the precise constructions shown. My intention is to cover hereby all adaptations, modifications and uses of the fastener shown which come within the practice of those skilled in the art to which the invention relates and within the scope of the appended claims.

Having described my invention, I claim:

1. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outuardly away from said shank at an obtuse angle to the axis thereof, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly to form a blind head at the nonaccessible side of said structures, said cylindrical end portion having an outside diameter about 91% to 99% that of the outside diameter of said body portion, said head of said nonblind member having a bearing surface on its side adjacent to said body portion, said nonblind member being of such length that its said cylindrical end portion opposite its said head projects beyond the nonaccessible side of said structures when said fastener is assembled in said structures with said head of said nonblind member in engagement with the accessible side of said structures, and said body portion of said nonblind member being of such length that its end opposite said head of said nonblind member does not project beyond the nonaccessible side of said structures when said fastener is assembled in said structures with said head of said nonblind member in engagement with the accessible side of said structures.

2. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof of about 150° to 160°, said head having a diameter about 1.4 to 1.8 times the mean thread diameter of said threaded shank, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly into a blind head at the nonaccessible side of said structures, said cylindrical end portion having an outside diameter approximately 91% to 99% that of the outside diameter of said body portion, said head of said nonblind member having a bearing surface on its side adjacent to said body portion, said nonblind member being of such length that its said cylindrical end portion opposite its said head projects beyond the nonaccessible side of said structures when said fastener is assembled in said structures with said head of said nonblind member in engagement with the accessible side of said structures, and said body portion of said nonblind member being of such length that its end opposite said head of said nonblind member does not project beyond the nonaccessible side of said structures when said fastener is assembled in said structures with said head of said nonblind member in engagement with the accessible side of said structures.

3. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly to form a blind head at the nonaccessible side of said structures, said cylindrical end portion having an outside diameter about 91% to 99% that of the outside diameter of said body portion, said cylindrical end portion being counterbored to reduce the wall thickness thereof to approximately 8% to 17% of the outside diameter of said body portions, said head of said nonblind member having a bearing surface on its side adjacent to said body portion, said nonblind member being of such length that its said cylindrical end portion opposite its said head projects beyond the nonaccessible side of said structures when said fastener is assembled in said structures with said head of said nonblind member in engagement with the accessible side of said structures, and said body portion of said nonblind member being of such length that its end opposite said head of said nonblind member does not project beyond the nonaccessible side of said structures when said fastener is assembled in said structures with said head of said nonblind member in engagement with the accessible side of said structures.

4. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof of about 150° to 160°, said head having a diameter about 1.4 to 1.8 times the mean thread diameter of said threaded shank, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly into a blind head at the nonaccessible side of said structures, said cylindrical end portion having an outside diameter approximately 91% to 99% that of the outside diameter of said body portion, said cylindrical end portion being counterbored to reduce the wall thickness thereof to approximately 8% to 17% of the outside diameter of said body portion, said head of said nonblind member having a bearing surface on its side adjacent to said body portion, said nonblind member being of such length that its said cylindrical end portion opposite its said head projects beyond the nonaccessible side of said structures, when said fastener is assembled in said structures with said head of said nonblind member in engagement with the accessible side of said structures, and said body portion of said nonblind member being of such length that its end opposite said head of said nonblind member does not project beyond the nonaccessible side of said structures when said fastener is assembled in said structures with said head of said nonblind member in engagement with the accessible side of said structures.

5. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member internally threaded onto said shank of said blind member, said nonblind member comprising a cylindrical tubular-like body portion having an outside diameter substantially equal to the diameter of said head of said blind member and integral head of larger diameter at the end of said body portion remote from said head of said blind member, said nonblind member also comprising a circumferential continuous cylindrical end portion at the end of said body portion opposite its said head adapted to be flared or expanded outwardly to form a blind head at the nonaccessible side of said structures, said cylindrical end portion having an outside diameter about 91% to 99% that of the outside diameter of said body portion, said head of said nonblind member having a bearing surface on its side adjacent to said body portion, said nonblind member being of such length that its cylindrical end portion opposite its said head projects beyond the nonaccessible side of said structures when said fastener is assembled in said structures with said head of said nonblind member in engagement with the accessible side of said structures, said body portion of said nonblind member being of such length that its end opposite said head of said nonblind member does not project beyond the nonaccessible side of said structures when said fastener is assembled in said structures with said head of said nonblind member in engagement with the accessible side of said structures, and a thread interference lock between said threads of said internal and external members equivalent to a class 5 interference fit as defined in Handbook H28 (1944), National Bureau of Standards, formed by a limited portion of said threads of said body portion of said external member being deformed by localized pressure applied to the exterior of said body portion.

6. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof of about 150° to 160°, said head having a diameter about 1.4 to 1.8 times the mean thread diameter of said threaded shank, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly into a blind head at the nonaccessible side of said structures, said cylindrical end portion having an outside diameter approximately 91% to 99% that of the outside diameter of said body portion, said head of said nonblind member having a bearing surface on its side adjacent to said body portion, said nonblind member being of such length that its cylindrical end portion opposite its said head projects beyond the nonaccessible side of said structures when said fastener is assembled in said structures with said head of said nonblind member in engagement with the accessible side of said structures, said body portion of said nonblind member being of such length that its end opposite said head of said nonblind member does not project beyond the nonaccessible side of said structures when said fastener is assembled in said structures with said head of said nonblind member in engagement with the accessible side of said structures, and a thread interference lock between said threads of said internal and external members equivalent to a class 5 interference fit as defined in Handbook H28 (1944), National Bureau of Standards, formed by a limited portion of said threads of said body portion of said external member being deformed by localized pressure applied to the exterior of said body portion.

7. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly to form a blind head at the nonaccessible side of said structures, said cylindrical end portion having an outside diameter about 91% to 99% that of the outside diameter of said body portion, said cylindrical end portion being counterbored to reduce the wall thickness thereof to approximately 8% to 17% of the outside diameter of said body portion, said head of said nonblind member having a bearing surface on its side adjacent to said body portion, said nonblind member being of such length that its said cylindrical end portion opposite its said head projects beyond the nonaccessible side of said structures when said fastener is assembled in said structures with said head of said nonblind member in engagement with the accessible side of said structures, said body portion of said nonblind member being of such length that its end opposite said head of said nonblind member does not project beyond the nonaccessible side of said structures when said fastener is assembled in said structures with said head of said nonblind member in engagement with the accessible side of said structures, and a thread interference lock between said threads of said internal and external members equivalent to a class 5 interference fit as defined in Handbook H28 (1944), National Bureau of Standards, formed by a limited portion of said threads of said body portion of said external member being deformed by localized pressure applied to the exterior of said body portion.

8. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof of about 150° to 160°, said head having a diameter about 1.4 to 1.8 times the mean thread diameter of said threaded shank, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member threaded onto said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly into a blind head at the nonaccessible side of said structures, said cylindrical end portion having an outside diameter approximately 91% to 99% that of the outside diameter of said body portion, said cylindrical end portion being counterbored to reduce the wall thickness thereof to approximately 8% to 17% of the outside diameter of said body portion, said head of said nonblind member having a bearing surface on its side adjacent to said body portion, said nonblind member being of such length that its said cylindrical end portion opposite its said head projects beyond the nonaccessible side of said structures when said fastener is assembled in said structures with said head of said nonblind member in engagement with the accessible side of said structures, said body portion of said nonblind member being of such length that its end opposite said head of said nonblind member does not project beyond the nonaccessible side of said structures when said fastener is assembled in said structures with said head of said nonblind member in engagement with the accessible side of said structures, and a thread interference lock between said threads of said internal and external members equivalent to a class 5 interference fit as defined in Handbook H28 (1944), National Bureau of Standards, formed by a limited portion of said threads of said body portion of said external member being deformed by localized pressure applied to the exterior of said body portion.

9. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member internally threaded throughout its length on said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly to form a blind head at the nonaccessible side of said structures, said cylindrical end portion having an outside diameter about 91% to 99% that of the outside diameter of said body portion, said head of said nonblind member having a bearing surface on its side adjacent to said body portion, said nonblind member being of such length that its said end portion opposite its said head projects beyond the nonaccessible side of said structures when said fastener is assembled in said structures with said head of said nonblind member in engagement with the accessible side of said structures, said body portion of said nonblind member being of such length that its end opposite said head of said nonblind member does not project beyond the nonaccessible side of said structures when said fastener is assembled in said structures with said head of said nonblind member in engagement with the accessible side of said structures.

10. In a two piece high strength blind fastener for securing together a plurality of structures having aligned circular apertures therein forming a passage therethrough and accessible from only one side, an internal or blind member comprising a threaded shank having a circular head at one end with a bearing surface on its shank side inclined outwardly away from said shank at an obtuse angle to the axis thereof of about 150° to 160°, said head having a diameter about 1.4 to 1.8 times the mean thread diameter of said threaded shank, said shank being of such length that said head thereon will be located behind the nonaccessible side of said structures when said fastener is assembled in said structures preparatory to driving, a driving connection at the end of said shank opposite said head, a weakened section intermediate said threaded shank and said driving connection, and an external or nonblind member internally threaded throughout its length on said shank of said blind member, said nonblind member comprising a cylindrical tubular-like body portion having an outside diameter substantially equal to the diameter of said head of said blind member and an integral head of larger diameter at the end of said body portion remote from said head of said blind member, said nonblind member also comprising a circumferential continuous cylindrical end portion at the end of said body portion opposite its said head adapted to be flared or expanded outwardly into a blind head at the nonaccessible side of said structures, said cylindrical end portion having an outside diameter approximately 91% to 99% that of the outside diameter of said body portion, said head of said nonblind member having a bearing surface on its side adjacent to said body portion, said nonblind member being of such length that its said end portion opposite its said head projects beyond the nonaccessible side of said structures when said fastener is assembled in said structures with said head of said nonblind member in engagement with the accessible side of said structures, said body portion of said nonblind member being of such length that its end opposite said head of said nonblind member does not project beyond the nonaccessible side of said structures when said fastener is assembled in said structures with said head of said nonblind member in engagement with the accessible side of said structures, and a thread interference lock between said threads of said internal and external members equivalent to a class 5 interference fit as defined in Handbook H28 (1944), National Bureau of Standards, formed by a limited portion of said threads of said body portion of said external member being deformed by localized pressure applied to the exterior of said body portion.

References Cited by the Examiner

UNITED STATES PATENTS

| | | | |
|---|---|---|---|
| 2,406,157 | 8/46 | Nelson | 85—77 |
| 2,408,559 | 10/46 | Keating | 85—77 |
| 2,974,558 | 3/61 | Hodell | 85—77 |
| 3,129,630 | 4/64 | Wing et al. | |
| 3,149,530 | 9/64 | Kolec | 85—77 |

FOREIGN PATENTS 928,122   5/47   France.

EDWARD C. ALLEN, *Primary Examiner.*